US009344962B2

United States Patent
Breitbach et al.

(10) Patent No.: US 9,344,962 B2
(45) Date of Patent: May 17, 2016

(54) METHOD FOR CONTROLLING THE ACTIVITY OF A BASE STATION ENTITY IN A MOBILE COMMUNICATION NETWORK

(75) Inventors: Markus Breitbach, Bonn (DE); Matthias Roebke, Cologne (DE); Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 167 days.

(21) Appl. No.: 13/977,739

(22) PCT Filed: Jan. 5, 2012

(86) PCT No.: PCT/EP2012/000036
§ 371 (c)(1),
(2), (4) Date: Sep. 20, 2013

(87) PCT Pub. No.: WO2012/093088
PCT Pub. Date: Jul. 12, 2012

(65) Prior Publication Data
US 2014/0003317 A1    Jan. 2, 2014

Related U.S. Application Data

(60) Provisional application No. 61/430,599, filed on Jan. 7, 2011.

(30) Foreign Application Priority Data

Jan. 7, 2011    (EP) ..................................... 11000087

(51) Int. Cl.
*H04W 4/00*    (2009.01)
*H04W 52/02*    (2009.01)
*H04W 84/04*    (2009.01)

(52) U.S. Cl.
CPC .......... *H04W 52/0206* (2013.01); *H04W 52/02* (2013.01); *H04W 52/0235* (2013.01); *H04W 84/045* (2013.01)

(58) Field of Classification Search
None
See application file for complete search history.

(56) References Cited

U.S. PATENT DOCUMENTS

2009/0285143 A1    11/2009    Kwun et al.
2011/0211514 A1*    9/2011    Hamalainen et al. ......... 370/311

FOREIGN PATENT DOCUMENTS

| EP | 2154921 A1 | 2/2010 |
| EP | 2184939 A1 | 5/2010 |
| WO | WO 2009140988 A1 | 11/2009 |
| WO | WO 2011094081 A1 | 8/2011 |

OTHER PUBLICATIONS

3GPP TSG RAN WG3 Meeting #60; Kansas City, USA, May 5-9, 2009; "Dynamic Setup of HNBs for Energy Savings and Interference Reduction".

* cited by examiner

*Primary Examiner* — Frank Duong
(74) *Attorney, Agent, or Firm* — Leydig, Voit & Mayer, Ltd.

(57) ABSTRACT

A method for controlling the activity of a base station in a mobile communication network via a mobile device, the base station being operable in a first and a second operational mode, the base station including a transmitter chain and a receiver chain, includes: receiving, by the mobile device, a first reactivation information, the first reactivation information being related to activating the first operational mode of the base station from the second operational mode of the base station; and transmitting, by the mobile device, a second reactivation information to the base station during a predetermined sensitive time interval of the base station so as to cause the base station to apply the first operational mode.

14 Claims, 1 Drawing Sheet

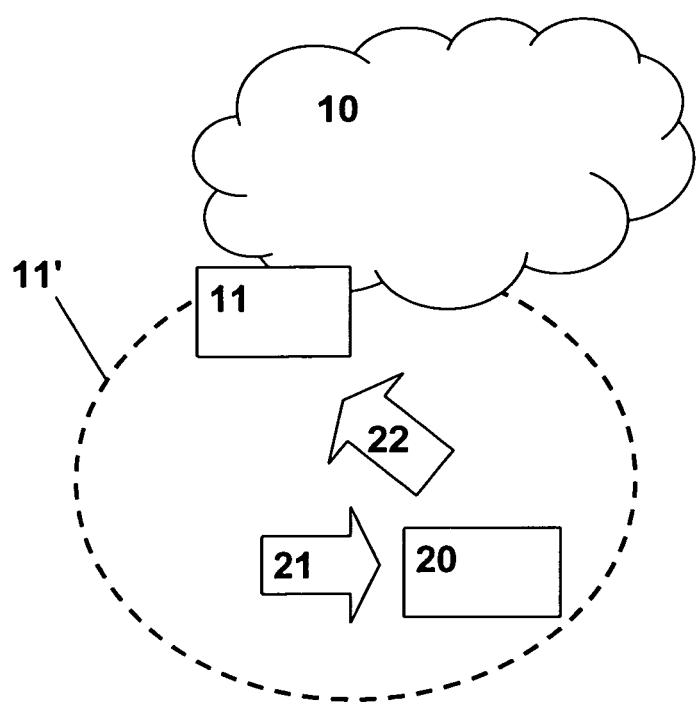

METHOD FOR CONTROLLING THE ACTIVITY OF A BASE STATION ENTITY IN A MOBILE COMMUNICATION NETWORK

CROSS-REFERENCE TO RELATED APPLICATIONS

This application is a U.S. National Phase application under 35 U.S.C. §371 of International Application No. PCT/EP2012/000036, filed on Jan. 5, 2012, and claims benefit to European Patent Application No. EP 11000087.4, filed on Jan. 7, 2011, and to U.S. Provisional Application No. 61/430,599, filed on Jan. 7, 2011. The International Application was published in English on Jul. 12, 2012 as WO 2012/093088 A1 under PCT Article 21(2).

FIELD

The present invention relates inter alia to a method for controlling the activity of a base station entity in a mobile communication network.

BACKGROUND

It is known in the field of mobile communication systems, including mobile communication networks and mobile devices, that mobile devices can enter a so-called sleep mode with a reduced power consumption. This enables a prolonged time of usage of the mobile device between two successive battery charging processes.

Especially during periods of low usage of the mobile communication network, the situation exists that base station entities are not used at all, i.e. in at least one network cell or some network cells of the typically cellular mobile communication network, there are no mobile devices present at all that request a communication service from the mobile communication network. It would be desirable to reduce the power consumption of especially those base stations or base station entities in periods of low usage of the mobile communication network. Presently, it is possible to monitor the network usage, e.g. by means of an operations and maintenance/management center (OMC) controlling the mobile communication network. In case that low network usage (or absence of network usage) is detected in one network cell or in a plurality of network cells, it would be possible to switch off at least partly the corresponding network equipment such as base station entities or other network components.

However, such a centrally managed approach in monitoring the network activity and controlling the powering (off and on) of the network equipment (e.g., by the operations and maintenance/management center) would normally lead to relatively long switching intervals or to a time lag especially with regard to the reactivation of the network components, i.e. after a period of reduced activity. Therefore, it is difficult or impossible to provide a dynamic reaction (i.e. a comparably quick change in the presence of network services after a period of (locally) reduced activity) to low usage situations of the mobile communication network. The existence of comparably long activation time constants for powering on network components to provide certain services of the mobile communication network either means that a powering off (during low usage situations) is not realized at all or that a powering off implies a reduction in the service level of the mobile communication network (e.g. such that only GERAN (Global System of Mobile Communication (GSM)/EDGE radio access network) functionalities are present and no (or only reduced) third (3G) or fourth (4G) generation services, such as Universal Mobile Telecommunication System (UMTS) or Long Term Evolution (LTE) services, are available during powering off periods due to the fact that locally 3G/4G network components and associated functionality is powered off). Especially, it is usually not possible to quickly activate a base station entity of a Universal Mobile Telecommunication System (UMTS) network or of a Long Term Evolution (LTE) network when a mobile device establishes a Packet Switched (PS) connection in a GERAN network in geographical vicinity.

SUMMARY

A method is provided for controlling the activity of a base station in a mobile communication network via a mobile device. The base station is operable in a first and a second operational mode. The base station includes a transmitter chain and a receiver chain. The method includes: receiving, by the mobile device, a first reactivation information, the first reactivation information being related to activating the first operational mode of the base station from the second operational mode of the base station; and transmitting, by the mobile device, a second reactivation information to the base station during a predetermined sensitive time interval of the base station so as to cause the base station to apply the first operational mode. The first operational mode corresponds to the base station transmitting radio frequency signals such that a control channel is received in a radio coverage area of the base station by the mobile device. The second operational mode corresponds to the base station switching off the transmitter chain and not providing the control channel in the radio coverage area of the base station, switching off the receiver chain of the base station for a predetermined inactivation time interval, and switching on the receiver chain of the base station for the predetermined sensitive time interval.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 schematically illustrates a mobile communication network comprising a base station entity and a mobile device.

DETAILED DESCRIPTION

In an embodiment, the present invention provides a method for controlling the activity of a base station entity in a mobile communication network such that on the one hand it is possible to reduce power consumption of the base station entity where (and when) network functionality is not required due to low usage of the network and in the same time to provide the possibility to quickly provide the requested network functionality in case that a mobile device requests such a functionality.

In an embodiment, a method is provided for controlling the activity of a base station entity in a mobile communication network by means of a mobile device, wherein the base station entity is able to be operated in at least a first and a second operational mode, wherein the base station entity comprises a transmitter chain and a receiver chain, wherein the first operational mode corresponds to the base station entity transmitting radio frequency signals such that a control channel is received in a radio coverage area of the base station entity by the mobile device, wherein the second operational mode corresponds to the base station entity switching off the transmitter chain and not providing the control channel in the radio coverage area of the base station entity, switching off the receiver chain of the base station entity for a predetermined inactivation time interval, and switching on the receiver chain of the base station entity for a predetermined sensitive time interval, wherein the method comprises the following steps:

in a first step, the mobile device receives a first reactivation information, the first reactivation information being related to the possibility and/or to the manner for the mobile device to activate the first operational mode of the base station entity starting from the second operational mode of the base station entity, in a second step, the mobile device transmits a second reactivation information to the base station entity during the predetermined sensitive time interval of the base station entity, wherein dependent on a reception of the second reactivation information by the base station entity the first operational mode of the base station entity is applied.

In a further embodiment, a method is provided for controlling the activity of a base station entity in a mobile communication network by a mobile device, wherein the base station entity is able to be operated in at least a first and a second operational mode, wherein the first operational mode corresponds to the base station entity transmitting radio frequency signals such that a control channel is received in a radio coverage area of the base station entity by the mobile device, wherein the second operational mode corresponds to the base station entity not providing the control channel in the radio coverage area of the base station entity, wherein the method comprises the following steps:

in a first step, the mobile device receives a first reactivation information, the first reactivation information being related to the possibility and/or to the manner for the mobile device to activate the first operational mode of the base station entity starting from the second operational mode of the base station entity, in a second step, the mobile device transmits a second reactivation information to the base station entity, wherein dependent on a reception of the second reactivation information by the base station entity the first operational mode of the base station entity is applied.

It is thereby advantageously possible that a base station entity can be activated in simple and effective manner such that the network functionalities and services can be provided to a user of the mobile device either instantaneously or at least with only a very short time lag. For example, it is possible according to the present invention to power off (i.e. switch to the second operational mode) such base station entities that are only in idle mode (due to low network usage or absence of network usage) and nevertheless to provide a good service quality to such users of the mobile communication network that request a service related to base station entity that has been powered off.

This leads to an overall reduction of power consumption of the mobile communication network as it is possible to power off certain base station entities and their auxiliary components such as cooling entities or the like in a more granular manner (both in time and from a geographical perspective). It is advantageous to not only switch off the transmitter chain (or the components providing the transmitting functionality) of the base station entity (in its second operational mode) but also the receiver chain (or the components providing the transmitting functionality) of the base station entity during the predetermined inactivation time interval. This has the advantage of further power savings in comparison to switching off only the transmitter chain (or the components providing the transmitting functionality) of the base station entity in its second operational mode. Furthermore, this has the still further advantage that in the second operational mode of the base station entity, it is possible to switch off auxiliary devices such as cooling devices (such as air conditioning or fan devices) as at least the average power consumption (and hence heat generation) of the base station entity, e.g., based on a succession of cycles comprising the predetermined inactivation time interval (e.g. 50 seconds) and the predetermined sensitive time interval (e.g. 10 seconds) is below a threshold such that the cooling devices are not required.

In an embodiment, it is preferred that during the second operational mode of the base station entity, there is a succession of cycles comprising a (constant) predetermined inactivation time interval and a (constant) predetermined sensitive time interval, such as, e.g., a cycle comprising 60 seconds comprises 50 seconds of the predetermined inactivation time interval and 10 seconds of the predetermined sensitive time interval, which results in a time sharing between the predetermined inactivation time interval and the predetermined sensitive time interval of 5:1. Alternatives include constantly sharing a cycle of 30 seconds or of 40 seconds or of 50 seconds or of 60 seconds or of 90 seconds or of 100 seconds or of 120 seconds between the predetermined inactivation time interval and the predetermined sensitive time interval according to the following ratios: 10:1, or 9:1, or 9:2, or 8:1, or 7:1, or 7:2, or 6:1, or 5:2, or 4:1, or 3:1. Alternatively, it is also possible that, besides such a first (or fast) cycle (between the predetermined inactivation time interval and the predetermined sensitive time interval), there is a second (or slower) cycle, e.g. once every 20, or 30 or 60 first cycles, such that the ratio between the predetermined inactivation time interval and the predetermined sensitive time interval is modified, e.g. the sensitive time interval is relatively longer in the $20^{th}$, or $30^{th}$, or $60^{th}$ first cycle.

In an embodiment, it is preferred that the first reactivation information comprises an indication when the predetermined reactivation time interval and/or the predetermined sensitive time interval begins and/or ends. It is thereby advantageously possible to provide the information about the sensitive time period or time interval (as well as its absolute beginning and/or end) of the base station entity to the mobile device.

It should be understood that according to the present invention, it is also possible—in the second operational mode of the base station entity—to deactivate or to use a second operational mode for only parts or components of a base station entity, e.g. power amplifiers related to certain transmission channels of the base station entity.

In the context of the present invention, it is to be understood that the principle of the invention is also applicable to other wireless technologies than GSM, UMTS, LTE or LTE-Advanced, namely to a TETRA mobile communication network, a satellite communication network, a WiMax communication network, a WLAN communication network or a cdma2000 mobile communication network.

Furthermore, in the context of the present invention, the term "base station entity" means an entity providing base station functionality such as a BTS (Base Transceiver Station) according to the GSM standard, and/or NodeB according to the UMTS standard, and/or eNodeB according to the LTE or LTE-Advanced standard, and/or Relay Node (RN) or Relay Station (RS), and/or Access Point according to the WLAN standard.

According to embodiments of the present invention, the control channel of the base station entity that is transmitted by the base station entity in the first operational mode (such that a control channel is received in a radio coverage area of the base station entity by the mobile device) and that is not transmitted by the base station entity in the second operational mode is a physical control channel.

For example, in case that in a specific geographical region there is a 2G mobile communication network (such as a GERAN network) and a 3G or 4G mobile communication network (such as a UMTS or LTE network), it is possible to power off the 3G/4G network components (i.e. the base station entities or parts of base station entities related to the 3G/4G services are in the second operational mode) and to provide a basic service level of the mobile communication network in the form of 2G connectivity. A mobile device that requests to have a 3G/4G service from the mobile communication network has the information (in the form of the first reactivation information) to activate or to reactivate (by transmitting the second reactivation information to the base station entity) the 3G/4G network components.

A reduced overall power consumption of the base station entity or of the plurality of base station entities of the mobile communication network is desirable as such but a reduced power consumption that is possible according to embodiments of the present invention enables the use and deployment of mobile communication networks even in a situation without the possibility to (economically) provide an electric grid. Furthermore, it is advantageous according to embodiments of the present invention that the emission of radiofrequency radiation (by base station entities) is reduced in situations or during time intervals where such an emission is not beneficial at all.

In an embodiment, the base station entity, in its second operational mode, does neither provide control channels nor pilot channels, i.e. preferably both the emission of the control channel or control channels and the emission of the pilot channel or pilot channels is powered off. It is preferred that the control channel is at least one out of the following:

a Broadcast Control Channel (e.g. BCCH), a pilot channel (e.g. CPICH), a physical synchronization channel (SCH)

a paging indicator channel (PICH).

A Broadcast Control Channel is present in mobile communication network according to the Global System of Mobile Communication (GSM) standard, according to the EDGE standard, according to the Universal Mobile Telecommunication System (UMTS) standard and according to the Long Term Evolution (LTE) standard. The Broadcast Control Channel is a point to multipoint, unidirectional (downlink) channel. The Broadcast Control Channel carries a repeating pattern of system information messages that describe the identity, configuration and available features of the base station entity.

According to embodiments of the present invention, by transmitting the second reactivation information, the mobile device tries to activate the base station entity (in its second operational mode) such that as a result of the activation (or reactivation) of the base station entity the control channel (or Broadcast Control Channel) is emitted by the base station entity. This means that the mobile device actively seeks to attach to a network part or domain of a specific type without detecting a control channel such as the Broadcast Control Channel of this specific type (e.g. a GSM type Broadcast Control Channel or a UMTS type Broadcast Control Channel or an LTE type Broadcast Control Channel) (and preferably also without detecting a pilot channel of this specific type).

According to embodiments of the present invention, it is preferred that the second reactivation information is at least one out of the following:

a radiofrequency signal of a predetermined pattern regarding its frequency and timing, a message or signal compliant to a communication on a Random Access Channel (RACH) of the base station entity.

Thereby, it is advantageously possible that the second reactivation information can be transmitted easily and effectively. According to one embodiment of the present invention, the second reactivation information has the form or the format of a message compliant to the RACH of the base station entity. According to another embodiment of the present invention, the second reactivation information is simply a radiofrequency signal of a predetermined pattern regarding its frequency and timing, e.g. a sinus impulse of a specific duration and at a specific frequency, or a suite of at least two impulses of a respective specific duration and at a respective specific frequency.

According to embodiments of the present invention, the second reactivation information serves to transmit an information to the base station entity of the information content of one bit, namely to switch on the base station entity or to switch on a specific part of the base station entity (i.e. for example the UMTS Broadcast Control Channel and related transceiver and control capacities). It is preferred that no information relating to the mobile device is transmitted by the second reactivation information, e.g. such that the mobile device having sent the second reactivation information can be identified later on. However the transmission of such an identification information is not excluded according to the present invention. It is preferred that a preamble signal (or a RACH preamble signal, especially according to 3GPP TS 25.211 of the UMTS standard or according to 3GPP TS 36.211 of the LTE standard) is used as the second reactivation information. By means of the first reactivation information, it is indicated (to the mobile device) which preamble signal (of a plurality of potentially different preamble signals) is to be used as second reactivation information.

Thereby, it is easily possible to transmit the first reactivation information by functionality of the base station entity that is not powered off.

Furthermore, it is also preferred according to embodiments of the present invention that the first reactivation information is dependent on or specific for at least one out of the following:

which service of a plurality of different services provided by the mobile communication network is requested by the mobile device;

whether the mobile device is in a roaming situation within the mobile communication network;

whether the base station entity or another base station entity is to be reactivated.

Thereby, it is advantageously possible to flexibly activate the base station entity by transmitting the second reactivation information by the mobile device to the base station entity. For example, it is possible that the first reactivation information is different (and indicates a different form or pattern of the second reactivation information) for the case that an activation of a Packet Switched (PS) service of the base station entity is requested compared to the activation of a Circuit Switched (CS) service of the base station entity.

Furthermore, it is possible and preferred that the first reactivation information is different and indicates a different second reactivation information for the case that the mobile device that potentially activates a service functionality of the base station is either roaming in the mobile communication network or not.

It is possible and preferred that the definition of the second reactivation information (by means of the first reactivation information) depends on different parameters such as the hour of the day or the day of the week or the like.

Furthermore, it is possible and preferred that for a specific user of the mobile communication network or for a specific group of users of the mobile communication network, a specific first reactivation information (indicating or being related to a specific second reactivation information) is transmitted (e.g. in a dedicated manner, i.e. such an information is not transmitted to other users of the mobile communication network). Thereby, it is advantageously possible to provide a differentiation in the degree that a user (or a mobile device) is able to power on the base station entity or a part of the base station entity. For example, it could be allowed to a specific user (or mobile device) or to a specific group of users (or their mobile devices) to power on not only the next base station entity but also the neighboring base station entities (such that in case of a movement of such a user a handover to neighboring network cells is more easily possible).

Furthermore, it is preferred according to embodiments of the present invention that the first reactivation information refers to at least one out of the following:
  a radio access technology of the base station entity regarding to which the first operational mode of the base station entity is possible to activate;
  a frequency or a plurality of frequencies that is/are possible to use for the second reactivation information;
  a format allowed for the second reactivation information;
  an indication of a discrete point in time or a plurality of discrete points in time or an indication of a time interval or a plurality of time intervals that is/are possible to be used for the second reactivation information, i.e. an indication about the predetermined inactivation time interval and/or the predetermined sensitive time interval and their starting and ending time;
  an indication about the geographic scope of validity of the first reactivation information.

Thereby, it is advantageously possible to provide both a comparably quick activation of the base station entity and the possibility for the base station entity to maximize the periods of time in the second operational mode resulting in a maximum of power saving while still providing an enhanced service level to the user of the mobile device. For example, it is possible that a specific radio access technology is indicated that can be activated by a specific second reactivation information. Furthermore, the parameters of the second reactivation information, such as the frequency, the format and the timing (that the second reactivation information has to comply with for successfully activating the base station entity), is defined and transmitted by the first reactivation information.

The parameters of the second reactivation information (transmitted by the first reactivation information) might also include the above mentioned parameters (i.e. especially the frequency, the format and the timing) for the activation of other base station entities (than the current base station entity), such as neighboring base station entities. In case that for certain geographical areas (comprising typically a plurality of cells of the mobile communication network) the parameters of the second reactivation information are identical then the limits of these geographical areas are transmitted by means of the first reactivation information.

According to embodiments of the present invention, the transmission of the first reactivation information (i.e. the distribution of the parameters of the second reactivation information) can be provided by means of a different mobile communication technology than the one to be activated by the mobile device (typically, in this case it is a mobile communication network of a different technology (e.g. 2G) of the same network operator than the mobile communication network to be temporarily and/or partly switched off).

Alternatively, it is also possible that the transmission of the first reactivation information (i.e. the distribution of the parameters of the second reactivation information) is provided by means of the same mobile communication technology that is to be activated provided that during some (regularly repeating or not) periods of time, the corresponding base station entities are switched on to transmit the first reactivation information. A realization thereof is a mobile communication network where the base station entities to be powered off temporarily have an activated Broadcast Control Channel (for some periods of time, preferably regularly repeated) that transmits the first reactivation information. Alternatively, it is also possible and preferred to provide a dedicated channel to transmit the first reactivation information with the above mentioned parameters (defining the second reactivation information) also in periods where the base station entity is in its second operational mode. Still alternatively, the first reactivation information can be transmitted using an Open Mobile Alliance (OMA) Device Management proceedings.

Embodiments of the present invention also relate to a mobile device for controlling the activity of a base station entity in a mobile communication network, wherein the base station entity is able to be operated in at least a first and a second operational mode, wherein the base station entity comprises a transmitter chain and a receiver chain, wherein the first operational mode corresponds to the base station entity transmitting radio frequency signals such that a control channel is received in a radio coverage area of the base station entity by the mobile device, wherein the second operational mode corresponds to the base station entity
  switching off the transmitter chain and not providing the control channel in the radio coverage area of the base station entity,
  switching off the receiver chain of the base station entity for a predetermined inactivation time interval, and
  switching on the receiver chain of the base station entity for a predetermined sensitive time interval,
wherein the mobile device is configured to receive a first reactivation information, the first reactivation information being related to the possibility and/or to the manner for the mobile device to activate the first operational mode of the base station entity starting from the second operational mode of the base station entity, and wherein the mobile device is configured to transmit a second reactivation information to the base station entity during the predetermined sensitive time interval of the base station entity, wherein dependent on a reception of the second reactivation information by the base station entity the first operational mode of the base station entity is applied.

Embodiments of the present invention additionally also relate to a mobile device for controlling the activity of a base station entity in a mobile communication network, wherein the base station entity is able to be operated in at least a first and a second operational mode, wherein the first operational mode corresponds to the base station entity transmitting radio frequency signals such that a control channel is received in a radio coverage area of the base station entity by the mobile device, wherein the second operational mode corresponds to the base station entity not providing the control channel in the radio coverage area of the base station entity, wherein the mobile device receives a first reactivation information, the first reactivation information being related to the possibility and/or to the manner for the mobile device to activate the first operational mode of the base station entity starting from the second operational mode of the base station entity, and wherein the mobile device transmits a second reactivation information to the base station entity, wherein dependent on a reception of the second reactivation information by the base station entity the first operational mode of the base station entity is applied.

Embodiments of the present invention also relate to a base station entity for being controlled by means of a mobile device in a mobile communication network, wherein the base station entity is able to be operated in at least a first and a second operational mode, wherein the base station entity comprises a transmitter chain and a receiver chain, wherein the first operational mode corresponds to the base station entity transmitting radio frequency signals such that a control channel is received in a radio coverage area of the base station entity by the mobile device, wherein the second operational mode corresponds to the base station entity switching off the transmitter chain and not providing the control channel in the radio coverage area of the base station entity, switching off the receiver chain of the base station entity for a predetermined inactivation time interval, and switching on the receiver chain of the base station entity for a predetermined sensitive time interval, wherein the mobile communication network is provided such that a first reactivation information is transmitted to the mobile device, the first reactivation information being related to the possibility and/or to the manner for the mobile device to activate the first operational mode of the base station entity starting from the second operational mode of the base station entity, and wherein the base station entity is furthermore provided such that the base station entity receives a second reactivation information from the mobile device during the predetermined sensitive time interval of the base station entity, wherein dependent on a reception of the second reactivation information by the base station entity the first operational mode of the base station entity is applied.

Embodiments of the present invention furthermore also relate to a base station entity for being controlled by means of a mobile device in a mobile communication network, wherein the base station entity is able to be operated in at least a first and a second operational mode, wherein the first operational mode corresponds to the base station entity transmitting radio frequency signals such that a control channel is received in a radio coverage area of the base station entity by the mobile device, wherein the second operational mode corresponds to the base station entity not providing the control channel in the radio coverage area of the base station entity, wherein the mobile communication network is provided such that a first reactivation information is transmitted to the mobile device, the first reactivation information being related to the possibility and/or to the manner for the mobile device to activate the first operational mode of the base station entity starting from the second operational mode of the base station entity, and wherein the base station entity is furthermore provided such that the base station entity receives a second reactivation information from the mobile device, wherein dependent on a reception of the second reactivation information by the base station entity the first operational mode of the base station entity is applied.

Furthermore, embodiments of the present invention relate to a mobile communication network for controlling the activity of a base station entity by means of a mobile device, wherein the base station entity is able to be operated in at least a first and a second operational mode, wherein the base station entity comprises a transmitter chain and a receiver chain, wherein the first operational mode corresponds to the base station entity transmitting radio frequency signals such that a control channel is received in a radio coverage area of the base station entity by the mobile device, wherein the second operational mode corresponds to the base station entity switching off the transmitter chain and not providing the control channel in the radio coverage area of the base station entity, switching off the receiver chain of the base station entity for a predetermined inactivation time interval, and switching on the receiver chain of the base station entity for a predetermined sensitive time interval, wherein the mobile communication network is provided such that a first reactivation information is transmitted to the mobile device, the first reactivation information being related to the possibility and/or to the manner for the mobile device to activate the first operational mode of the base station entity starting from the second operational mode of the base station entity, and wherein the mobile communication network is furthermore provided such that the base station entity receives a second reactivation information from the mobile device during the predetermined sensitive time interval of the base station entity, wherein dependent on a reception of the second reactivation information by the base station entity the first operational mode of the base station entity is applied.

Furthermore, embodiments of the present invention also relate to a mobile communication network for controlling the activity of a base station entity by means of a mobile device, wherein the base station entity is able to be operated in at least a first and a second operational mode, wherein the first operational mode corresponds to the base station entity transmitting radio frequency signals such that a control channel is received in a radio coverage area of the base station entity by the mobile device, wherein the second operational mode corresponds to the base station entity not providing the control channel in the radio coverage area of the base station entity, wherein the mobile communication network is provided such that a first reactivation information is transmitted to the mobile device, the first reactivation information being related to the possibility and/or to the manner for the mobile device to activate the first operational mode of the base station entity starting from the second operational mode of the base station entity, and wherein the mobile communication network is furthermore provided such that the base station entity receives a second reactivation information from the mobile device, wherein dependent on a reception of the second reactivation information by the base station entity the first operational mode of the base station entity is applied.

Furthermore, embodiments of the present invention relate to a program comprising a computer readable program code for controlling a mobile device for controlling the activity of a base station entity in a mobile communication network, wherein the base station entity is able to be operated in at least a first and a second operational mode, wherein the base station entity comprises a transmitter chain and a receiver chain, wherein the first operational mode corresponds to the base station entity transmitting radio frequency signals such that a control channel is received in a radio coverage area of the base station entity by the mobile device, wherein the second operational mode corresponds to the base station entity
    switching off the transmitter chain and not providing the control channel in the radio coverage area of the base station entity,
    switching off the receiver chain of the base station entity for a predetermined inactivation time interval, and
    switching on the receiver chain of the base station entity for a predetermined sensitive time interval,
wherein the mobile device receives a first reactivation information, the first reactivation information being related to the possibility and/or to the manner for the mobile device to activate the first operational mode of the base station entity starting from the second operational mode of the base station entity during the predetermined sensitive time interval of the base station entity, and wherein the mobile device transmits a second reactivation information to the base station entity, wherein dependent on a reception of the second reactivation information by the base station entity the first operational mode of the base station entity is applied.

Furthermore, embodiments of the present invention also relate to a program comprising a computer readable program code for controlling a mobile device for controlling the activity of a base station entity in a mobile communication network, wherein the base station entity is able to be operated in at least a first and a second operational mode, wherein the first operational mode corresponds to the base station entity transmitting radio frequency signals such that a control channel is received in a radio coverage area of the base station entity by the mobile device, wherein the second operational mode corresponds to the base station entity not providing the control channel in the radio coverage area of the base station entity, wherein the mobile device receives a first reactivation information, the first reactivation information being related to the possibility and/or to the manner for the mobile device to activate the first operational mode of the base station entity starting from the second operational mode of the base station entity, and wherein the mobile device transmits a second reactivation information to the base station entity, wherein dependent on a reception of the second reactivation information by the base station entity the first operational mode of the base station entity is applied.

Embodiments of the present invention also relate to a computer program product comprising an inventive program.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

In FIG. 1, a mobile communication network 10 is schematically shown having a base station entity 11. The base station entity 11 typically comprises a transmitter chain and a receiver chain (or components providing the transmitting functionality of the base station entity, and components providing the transmitting functionality of the base station entity), and has a radio coverage area 11' and a mobile device 20 is depicted being located within the radio coverage area 11' of the base station entity 11. The base station entity 11 is able to be operated in at least a first operational mode and a second operational mode. The first operational mode corresponds to the base station entity 11 transmitting radio frequency signals such that a control channel is received in the radio coverage area 11' of the base station entity 11 by the mobile device 20. This corresponds to the normal (and standardized) behavior and situation of both the mobile device 20 and the base station entity 11. According to an embodiment of the present invention, the base station entity is able to be operated in the second operational mode which corresponds to the base station entity 11 being at least partly switched off. This means that at least during power saving time intervals the control channel is not provided in the radio coverage area 11' of the base station entity 11 as the transmitter chain of the of base station entity 11 is switched off (or is deactivated) in the second operational mode. According to the normal (standardized) behavior of the mobile device 20 and the base station entity 11 (or the mobile communication network 10), the mobile device 20 interprets this situation as a situation where a specific requested service of the mobile communication network 10 is not available and an attachment, e.g. to a high bitrate Packet Switched (PS) service, is not possible. According to an embodiment of the present invention, also the receiver chain of the base station entity 11 is switched off (or is deactivated) (during the second operational mode) at least during a predetermined inactivation time interval. During a predetermined sensitive time interval (during the second operational mode of the base station entity), the receiver chain is switched on (or is activated).

A first reactivation information 21 is provided to the mobile device 20 indicating that by transmitting a specific signal to the base station entity 11, a reactivation of the base station entity 11 (with the presence of the Broadcast Control Channel) is possible to achieve. This specific signal is a second reactivation information 22 to be transmitted by the mobile device 20 to the base station entity 11. The second reactivation information 22 is transmitted to the base station entity 11 during the predetermined sensitive time interval of the base station entity 11. During the second operational mode of the base station entity, it is preferred that there is a succession of cycles comprising the (preferably constant) predetermined inactivation time interval and the (preferably constant) predetermined sensitive time interval. As an example, such a cycle (comprising e.g. 60 seconds) comprises 50 seconds of the predetermined inactivation time interval and 10 seconds of the predetermined sensitive time interval, which results in a time sharing between the predetermined inactivation time interval and the predetermined sensitive time interval of 5:1. Alternative sharing ratios and alternative cycle lengths are also possible according to embodiments of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The invention claimed is:

1. A method for controlling the activity of a base station in a mobile communication network via a mobile device, wherein the base station is operable in a first and a second operational mode and wherein the base station comprises a transmitter chain and a receiver chain, the method comprising:
    receiving, by the mobile device, a first reactivation information, the first reactivation information being related to activating the first operational mode of the base station from the second operational mode of the base station;
    transmitting, by the mobile device, a second reactivation information to the base station during a predetermined sensitive time interval of the base station so as to cause the base station to apply the first operational mode, wherein the second reactivation information comprises information content of one bit that causes only a specific part of the base station to be switched on for providing a control channel;
    wherein the first operational mode corresponds to the base station transmitting radio frequency signals such that the control channel is received in a radio coverage area of the base station by the mobile device; and
    wherein the second operational mode corresponds to the base station switching off the transmitter chain and not providing the control channel in the radio coverage area of the base station, switching off the receiver chain of the base station for a predetermined inactivation time interval, and switching on the receiver chain of the base station for the predetermined sensitive time interval.

2. The method of claim 1, wherein the control channel is at least one of: a Broadcast Control Channel, a pilot channel, a physical synchronization channel, or a paging indicator channel.

3. The method of claim 1, wherein the second reactivation information is at least one of: a radiofrequency signal of a predetermined pattern regarding its frequency and timing; or a message or signal compliant to a communication on a Random Access Channel (RACH) of the base station.

4. The method of claim 1, wherein the first reactivation information is transmitted using a first technology of the mobile communication network, wherein the second reactivation information is transmitted using a second technology of the mobile communication network.

5. The method of claim 1, wherein the first reactivation information is dependent on at least one of: which service of a plurality of different services provided by the mobile communication network is requested by the mobile device; whether the mobile device is in a roaming situation within the mobile communication network; or whether the base station or another base station is to be reactivated.

6. The method of claim 1, wherein the first reactivation information comprises at least one of: an indication when the predetermined reactivation time interval begins; an indication when the predetermined reactivation time interval ends; an indication when the predetermined sensitive time interval begins; or an indication when the predetermined sensitive time interval ends.

7. The method of claim 1, wherein the first reactivation information refers to at least one of: a radio access technology of the base station regarding to which the first operational mode of the base station is possible to activate; a frequency or a plurality of frequencies that is/are possible to use for the second reactivation information; a format allowed for the second reactivation information; or an indication about the geographic scope of validity of the first reactivation information.

8. A mobile device for controlling the activity of a base station in a mobile communication network via a mobile device, wherein the base station is operable in a first and a second operational mode and wherein the base station comprises a transmitter chain and a receiver chain, the mobile device comprising a processor and a memory, the mobile device being configured to:
    receive a first reactivation information, the first reactivation information being related to activating the first operational mode of the base station from the second operational mode of the base station; and
    transmit a second reactivation information to the base station during a predetermined sensitive time interval of the base station so as to cause the base station to apply the first operational mode, wherein the second reactivation information comprises information content of one bit that causes only a specific part of the base station to be switched on for providing a control channel;
    wherein the first operational mode corresponds to the base station transmitting radio frequency signals such that the control channel is received in a radio coverage area of the base station by the mobile device; and
    wherein the second operational mode corresponds to the base station switching off the transmitter chain and not providing the control channel in the radio coverage area of the base station, switching off the receiver chain of the base station for a predetermined inactivation time interval, and switching on the receiver chain of the base station for the predetermined sensitive time interval.

9. The mobile device of claim 8, wherein the second reactivation information is at least one of: a radiofrequency signal of a predetermined pattern regarding its frequency and timing; or a message or signal compliant to a communication on a Random Access Channel (RACH) of the base station.

10. A base station controllable by a mobile device via a mobile communication network, wherein the base station is operable in a first and a second operational mode, the base station comprising:
    a transmitter chain;
    a receiver chain; and
    a processor, configured to cause the base station to be operated in the second operational mode, and in response to receiving a second reactivation information during a predetermined sensitive time interval, apply the first operational mode, wherein the second reactivation information is received from the mobile device in response to the mobile device receiving first reactivation information related to activating the first operational mode of the base station from the second operational mode of the base station, and wherein the second reactivation information comprises information content of one bit that causes only a specific part of the base station to be switched on for providing a control channel;
    wherein the first operational mode corresponds to the base station transmitting radio frequency signals such that the control channel is received in a radio coverage area of the base station by the mobile device; and wherein the second operational mode corresponds to the base station switching off the transmitter chain and not providing the control channel in the radio coverage area of the base station, switching off the receiver chain of the base station for a predetermined inactivation time interval, and switching on the receiver chain of the base station for the predetermined sensitive time interval.

11. The base station of claim 10, wherein the second reactivation information is at least one of: a radiofrequency signal of a predetermined pattern regarding its frequency and timing; or a message or signal compliant to a communication on a Random Access Channel (RACH) of the base station.

12. A mobile communication network for controlling the activity of a base station by a mobile device, wherein the base station is operable in a first and a second operational mode, comprising:
- the mobile device, configured to receive a first reactivation information related to activating the first operational mode of the base station from the second operational mode of the base station; and
- the base station, configured to receive a second reactivation information from the mobile device, and in response thereto to apply the first operational mode of the base station, wherein the second reactivation information comprises information content of one bit that causes only a specific part of the base station to be switched on for providing a control channel;
- wherein the first operational mode corresponds to the base station transmitting radio frequency signals such that the control channel is received in a radio coverage area of the base station by the mobile device; and
- wherein the second operational mode corresponds to the base station not providing the control channel in the radio coverage area of the base station.

13. The mobile communication network of claim 12, wherein the second reactivation information is at least one of: a radiofrequency signal of a predetermined pattern regarding its frequency and timing; or a message or signal compliant to a communication on a Random Access Channel (RACH) of the base station.

14. A non-transitory computer-readable medium of a mobile device having processor-executable instructions for controlling the activity of a base station in a mobile communication network via the mobile device, wherein the base station is operable in a first and a second operational mode and wherein the base station comprises a transmitter chain and a receiver chain, the processor-executable instructions, when executed by a processor, causing the following steps to be performed:
- receiving a first reactivation information, the first reactivation information being related to activating the first operational mode of the base station from the second operational mode of the base station;
- transmitting a second reactivation information to the base station during a predetermined sensitive time interval of the base station so as to cause the base station to apply the first operational mode, wherein the second reactivation information comprises information content of one bit that causes only a specific part of the base station to be switched on for providing a control channel;
- wherein the first operational mode corresponds to the base station transmitting radio frequency signals such that the control channel is received in a radio coverage area of the base station by the mobile device; and
- wherein the second operational mode corresponds to the base station switching off the transmitter chain and not providing the control channel in the radio coverage area of the base station, switching off the receiver chain of the base station for a predetermined inactivation time interval, and switching on the receiver chain of the base station for the predetermined sensitive time interval.

* * * * *